(12) United States Patent
Chen et al.

(10) Patent No.: US 12,107,988 B2
(45) Date of Patent: Oct. 1, 2024

(54) INFORMATION INPUT METHOD, TERMINAL, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Zhiye Chen, Guangdong (CN); Kaihui Liu, Guangdong (CN); Yingyi Wu, Guangdong (CN); Ying Pan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 283 days.

(21) Appl. No.: 17/682,824

(22) Filed: Feb. 28, 2022

(65) Prior Publication Data

US 2022/0272188 A1     Aug. 25, 2022

Related U.S. Application Data

(63) Continuation of application No. PCT/CN2020/109857, filed on Aug. 18, 2020.

(30) Foreign Application Priority Data

Aug. 30, 2019    (CN) .......................... 201910815339.X

(51) Int. Cl.
    *H04M 1/05*         (2006.01)
    *G06F 3/0486*      (2013.01)
    (Continued)

(52) U.S. Cl.
    CPC ...... *H04M 1/72469* (2021.01); *G06F 3/0486* (2013.01); *H04M 1/27457* (2020.01); *H04M 1/27475* (2020.01)

(58) Field of Classification Search
    CPC ......... H04M 1/72469; H04M 1/27457; H04M 1/27475; G06F 3/0486
See application file for complete search history.

(56) References Cited

U.S. PATENT DOCUMENTS

2007/0236411 A1* 10/2007 Kurosaki .............. G06F 1/1601
                                                  348/E5.12
2008/0172208 A1*  7/2008 Lechine .................. G06F 30/00
                                                      703/1

(Continued)

FOREIGN PATENT DOCUMENTS

| CN | 103051768 | 4/2013 |
| CN | 103823621 | 5/2014 |

(Continued)

OTHER PUBLICATIONS

JPO, Notice of Reasons for Refusal for JP Application No. 2022-513472, Apr. 25, 2023.

(Continued)

*Primary Examiner* — Moustapha Diaby
(74) *Attorney, Agent, or Firm* — Hodgson Russ LLP

(57) ABSTRACT

An information input method, a terminal, and a non-transitory computer-readable storage medium are disclosed. The method includes controlling a bottom modal view to be displayed on a current user interface, in response to receiving a first instruction configured for indicating a state in which first information is to be received, the bottom modal view being a floating layer page displayed on the current user interface, having an area less than that of the current user interface, and comprising a first input widget; and controlling the first information to be input based on an input signal in response to the first input widget being triggered.

18 Claims, 12 Drawing Sheets

(51) Int. Cl.
  *H04M 1/27457* (2020.01)
  *H04M 1/27475* (2020.01)
  *H04M 1/72469* (2021.01)

(56) References Cited

U.S. PATENT DOCUMENTS

| | | |
|---|---|---|
| 2010/0077344 A1* | 3/2010 | Gaffney ............... G06F 3/0481 |
| | | 715/788 |
| 2013/0091156 A1 | 4/2013 | Raiche et al. |
| 2013/0155072 A1* | 6/2013 | Chiu .................. G06F 3/04817 |
| | | 345/173 |
| 2013/0321340 A1 | 12/2013 | Seo et al. |
| 2014/0237420 A1 | 8/2014 | Song et al. |
| 2014/0337790 A1 | 11/2014 | Kim et al. |
| 2015/0293704 A1 | 10/2015 | Gschwind et al. |
| 2015/0346957 A1 | 12/2015 | Louch |
| 2018/0150208 A1 | 5/2018 | Song et al. |
| 2018/0164963 A1 | 6/2018 | Ku et al. |

FOREIGN PATENT DOCUMENTS

| | | |
|---|---|---|
| CN | 105607816 | 5/2016 |
| CN | 106210916 | 12/2016 |
| CN | 106293473 | 1/2017 |
| CN | 106406739 | 2/2017 |
| CN | 106855796 | 6/2017 |
| CN | 107066174 | 8/2017 |
| CN | 108052356 | 5/2018 |
| CN | 108427588 | 8/2018 |
| CN | 304946072 | 12/2018 |
| CN | 109830233 | 5/2019 |
| CN | 110062105 | 7/2019 |
| CN | 110119296 | 8/2019 |
| CN | 110231910 | 9/2019 |
| CN | 110515524 | 11/2019 |
| EP | 3333688 | 6/2018 |
| JP | 2011253553 A | 12/2011 |
| JP | 2012527694 A | 11/2012 |
| JP | 2013090242 A | 5/2013 |
| WO | 2015183504 | 12/2015 |

OTHER PUBLICATIONS

WIPO, International Search Report for PCT/CN2020/109857, Nov. 25, 2020.
CNIPA, First Office Action for CN Application No. 202011408896.9, Nov. 2, 2021.
CNIPA, First Office Action for CN Application No. 201910815339.X, Aug. 28, 2020.
CNIPA, Notification to Grant Patent Right for Invention for CN Application No. 201910815339.X, Oct. 29, 2020.
JPO, Office Action for JP Application No. 2022-513472, Oct. 24, 2023.
IPI, Office Action for IN Application No. 202217018247, Aug. 16, 2022.
EPO, Extended European Search Report for EP Application No. 20859065.3, Sep. 27, 2022.
KIPO, Office Action for KR Application No. 10-2022-7010364, Apr. 2, 2024.

* cited by examiner

INFORMATION INPUT METHOD, TERMINAL, AND NON-TRANSITORY COMPUTER-READABLE STORAGE MEDIUM

CROSS REFERENCE TO RELATED APPLICATIONS

The present disclosure is a continuation of International Patent Application No. PCT/CN2020/109857, filed Aug. 18, 2020, which claims priority to Chinese Patent Application No. 201910815339.X, filed Aug. 30, 2019, the entire disclosures of which are incorporated herein by reference.

TECHNICAL FIELD

The present disclosure relates to the technical field of computers, in particular to an information input method, a terminal, and a non-transitory computer-readable storage medium.

BACKGROUND

With the increasing ability of mobile terminals to record information, it has become a common scenario for users to record valuable information for designated objects by the mobile terminals in their daily lives.

In a manner possible to be implemented, when a terminal needs information about a new-built contact, the terminal will pop up a full-screen user interface. The user interface may include input boxes set for a name, phone numbers, an email, a company, a position, a remark, or a group, and so on.

SUMMARY OF THE DISCLOSURE

According to a first aspect of the present disclosure, an inputting information method is provided and includes: displaying a bottom modal view on a current user interface, in response to receiving a first instruction configured to indicate a state for receiving first information, the bottom modal view being a floating layer page displayed on the current user interface and including a first input widget, an area of the bottom modal view being less than an area of the current user interface; and inputting the first information based on an input signal in response to the first input widget being triggered.

According to a second aspect of the present disclosure, a terminal is provided and includes: a screen; a processor; and a memory connected to the processor and storing program instructions. When the program instructions executed by the processor, causing the processor to perform operations of: instructing the screen to display a bottom modal view on a current user interface, in response to receiving a first instruction configured to indicate the terminal to receive first information, the bottom modal view being a floating layer page displayed on the current user interface and including a first input widget, an area of the bottom modal view being less than an area of the current user interface; and inputting the first information based on an input signal in response to the first input widget being triggered.

According to a third aspect of the present disclosure, a non-transitory computer-readable storage medium is provided and configured to store program instructions. When the program instructions are executed by a processor, performing operations of: instructing a screen to display a bottom modal view on a current user interface, in response to receiving a first instruction configured to indicate a state for receiving first information, the bottom modal view being a floating layer page displayed on the current user interface and including a first input widget, an area of the bottom modal view being less than an area of the current user interface; and inputting the first information based on an input signal in response to the first input widget being triggered.

BRIEF DESCRIPTION OF THE DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For those skilled in the art, other drawings can be obtained based on these drawings without creative work.

DETAILED DESCRIPTION

Figure 1:
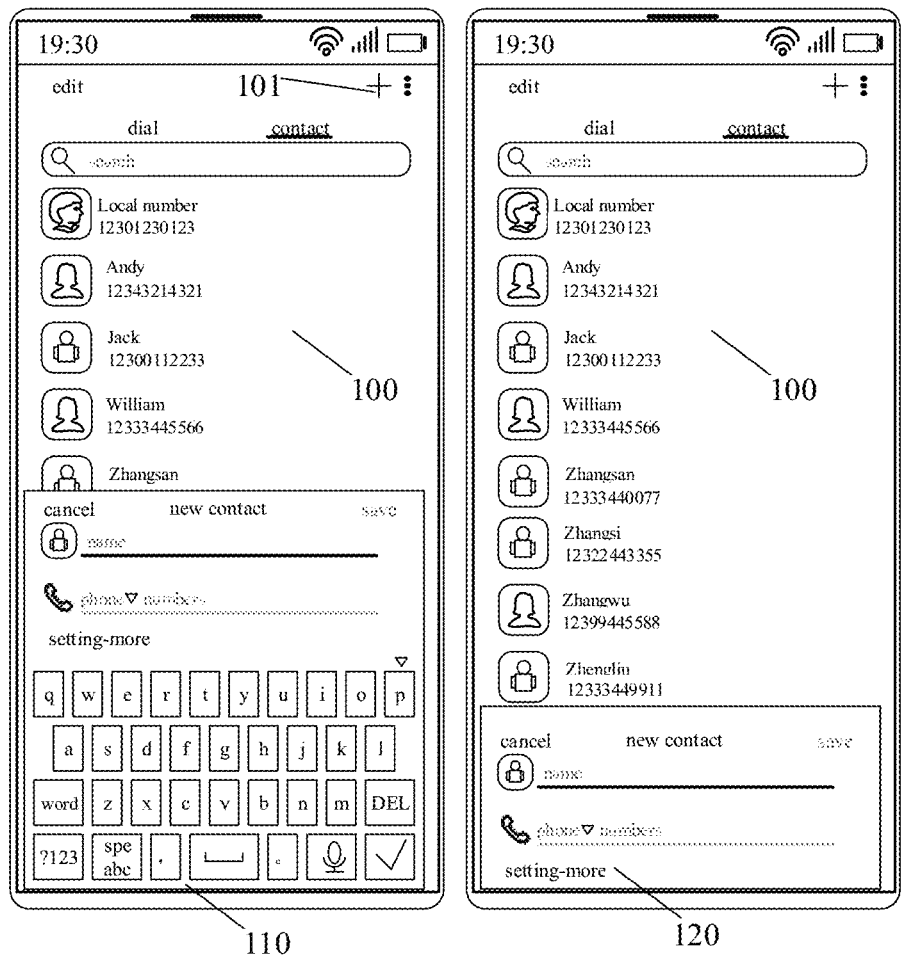
FIG. 1 is a schematic diagram of a bottom modal view according to some embodiments of the present disclosure.

In order to make the purpose, technical solutions and advantages of the present disclosure clearer, a description in detail for the embodiments of the present disclosure will be further made in the following in conjunction with the accompanying drawings.

Where the following description relates to the accompanying drawings, unless otherwise indicated, the same numerals in different accompanying drawings indicate the same or similar elements. The implementations described in the following exemplary embodiments are not intended to represent all embodiments that are consistent with the present disclosure. On the contrary, they are only examples of the apparatus and the method that are consistent with some aspects of the present disclosure as detailed in the appended claims.

In the description of the present disclosure, it should be understood that terms such as "first", "second", and the like, are used herein for purposes of description, and are not intended to indicate or imply relative importance or significance. In the description of the present disclosure, it should be noted that, unless specified or limited, otherwise, terms "connection", "connected" may be used in a broad sense, and may include, for example, fixed connections, detachable connections, or integral connections; may also be mechanical, electrical connections; may also be direct connections or indirect connections via intervening structures; the specific meanings of the terms above in the present disclosure can be understood by one skilled in the art depending on specific contexts. In addition, in the description of the present disclosure, it should be noted that, "a plurality of" means two or more, unless specified otherwise. The term "and/or" is used to describe the associated relationship of the associated objects, which indicates that there may exist three relationships, for example, A and/or B, may indicate three situations: A exists alone, A and B exist at the same time, and B exists alone. The character "/" generally indicates that the associated objects before and after the character "/" is an "or" relationship.

According to a first aspect of the present disclosure, an inputting information method is provided and includes: displaying a bottom modal view on a current user interface, in response to receiving a first instruction configured to indicate a state for receiving first information, the bottom modal view being a floating layer page displayed on the current user interface and including a first input widget, an area of the bottom modal view being less than an area of the current user interface; and inputting the first information based on an input signal in response to the first input widget being triggered.

In some embodiments, after the displaying a bottom modal view on a current user interface, in response to receiving a first instruction, the method further including: converting the bottom modal view to a full-screen modal view in response to receiving a second instruction, an area of the full-screen modal view being same with the area of the current user interface, and the second instruction being triggered in response to a specified operation being performed on the bottom modal view; or converting the bottom modal view to a reduced modal view in response to receiving a third instruction, an area of the reduced modal view being less than the area of the bottom modal view.

In some embodiments, after the converting the bottom modal view to a full-screen modal view, the method further including: displaying m second input widgets in the full-screen modal view, the second input widgets being different from the first input widget, and m being a positive integer; and storing a second information in response to receiving the second information on the second input widgets.

In some embodiments, after the converting the bottom modal view to a full-screen modal view, the method further including: receiving a sliding-downward instruction generated in response to a dragging-downward operation on a top border of the full-screen modal view; converting the full-screen modal view to the bottom modal view in response to a sliding distance resulted from the sliding-downward instruction being greater than or equal to a first threshold and less than a second threshold; and converting the full-screen modal view to the reduced modal view in response to the sliding distance resulted from the sliding-downward instruction being greater than or equal to the second threshold.

In some embodiments, after the converting the bottom modal view to a reduced modal view, the method further including: displaying a storage widget in the reduced modal view; and storing the first information in response to the storage widget being triggered.

In some embodiments, after the converting the bottom modal view to a reduced modal view, the method further including: receiving a sliding-upward instruction generated in response to a dragging-upward operation on a top border of the reduced modal view; converting the reduced modal view to the bottom modal view in response to a sliding distance resulted from the sliding-upward instruction being greater than or equal to a third threshold and less than a fourth threshold; and converting the reduced modal view to the full-screen modal view in response to the sliding distance resulted from the sliding-upward instruction being greater than or equal to the fourth threshold.

In some embodiments, the bottom modal view includes a full-screen modal button, the converting the bottom modal view to a full-screen modal view in response to receiving a second instruction, includes: converting the bottom modal view to the full-screen modal view in response to the full-screen modal button being triggered.

In some embodiments, the first information has first n parameters having the most historical edit times, the bottom modal view includes n third input widgets, and each of the third input widgets corresponds to a parameter of the first n parameters.

In some embodiments, each of the third input widgets corresponds to the parameter of the first n parameters in response to n being less than a preset threshold, and the preset threshold indicates a number of widgets in the bottom modal view.

In some embodiments, the first instruction is an instruction for selecting a storage path of a target object, and the target object is an object displayed in the current user interface.

In some embodiments, the first information comprises at least one of: contact information, schedule information, note information, timer information, path information, and mail information.

According to a second aspect of the present disclosure, a terminal is provided and includes: a screen; a processor; and a memory connected to the processor and storing program instructions. When the program instructions executed by the processor, causing the processor to perform operations of: instructing the screen to display a bottom modal view on a current user interface, in response to receiving a first instruction configured to indicate the terminal to receive first information, the bottom modal view being a floating layer page displayed on the current user interface and including a first input widget, an area of the bottom modal view being less than an area of the current user interface; and inputting the first information based on an input signal in response to the first input widget being triggered.

In some embodiments, the processor is further configured to perform operations of: converting the bottom modal view to a full-screen modal view in response to receiving a second instruction, an area of the full-screen modal view being same with the area of the current user interface, and the second instruction being an instruction triggered in response to a specified operation being performed on the bottom modal view; or converting the bottom modal view to a reduced modal view in response to receiving a third instruction, an area of the reduced modal view being less than the area of the bottom modal view.

In some embodiments, the processor is further configured to implement operations of: constructing the screen to display m second input widgets in the full-screen modal view, the second input widgets being different from the first input widget, and m being a positive integer; and storing a second information in the terminal in response to receiving the second information on the second input widgets.

In some embodiments, the processor is further configured to perform operations of: receiving a sliding-downward instruction generated in response to a dragging-downward operation on a top border of the full-screen modal view; converting the full-screen modal view to the bottom modal view in response to a sliding distance resulted from the sliding-downward instruction being greater than or equal to a first threshold and less than a second threshold; and converting the full-screen modal view to the reduced modal view in response to the sliding distance resulted from the sliding-downward instruction being greater than or equal to the second threshold.

In some embodiments, the processor is further configured to perform operations of: constructing the screen to display a storage widget in the reduced modal view; and storing the first information in response to the storage widget being triggered.

In some embodiments, the processor is further configured to perform operations of: receiving a sliding-upward instruction generated in response to a dragging-upward operation on a top border of the reduced modal view; converting the reduced modal view to the bottom modal view in response to a sliding distance resulted from the sliding-upward instruction being greater than or equal to a third threshold and less than a fourth threshold; and converting the reduced modal view to the full-screen modal view in response to the sliding distance resulted from the sliding-upward instruction being greater than or equal to the fourth threshold.

In some embodiments, the bottom modal view includes a full-screen modal button, the second instruction is indicated by the full-screen modal button being triggered.

In some embodiments, the first information has first n parameters having the most historical edit times, the bottom modal view includes n third input widgets, and each of the third input widgets corresponds to a parameter of the first n parameters.

According to a third aspect of the present disclosure, a non-transitory computer-readable storage medium is provided and configured to store program instructions. When the program instructions are executed by a processor, performing operations of: instructing a screen to display a bottom modal view on a current user interface, in response to receiving a first instruction configured to indicate a state for receiving first information, the bottom modal view being a floating layer page displayed on the current user interface and comprising a first input widget, an area of the bottom modal view being less than an area of the current user interface; and inputting the first information based on an input signal in response to the first input widget being triggered.

In order to make the solutions provided in the embodiments of the present disclosure easy to be understood, several terms appearing in the embodiments of the present disclosure are introduced in the following.

A bottom modal view is a floating layer page displayed on a current user interface, an area of the bottom modal view is less than an area of the current user interface. In an embodiment, the bottom modal view can be displayed when a first instruction is received in a terminal. In a possible display manner, the bottom modal view is capable of covering a bottom of the current user interface without obscuring an upper half part of the current user interface.

For an animation effect in which the bottom modal view is displayed, the animation effect may be an animation effect of popping up or fading in from the bottom to the top.

FIG. 1 is a schematic diagram of a bottom modal view according to some embodiments of the present disclosure. In FIG. 1, a bottom modal view 110 and a bottom modal view 120 are included. A bottom modal view 110 is a display state of a bottom modal view with an input keyboard, and a bottom modal view 120 is a display state of a bottom modal view without the input keyboard. In FIG. 1, the bottom modal view 110 is a floating layer page on a current user interface 100, and the bottom modal view 110 obscures content of a lower half of the current user interface 100. It should be noted that the bottom modal view 120 also obscures a part of content of the current user interface 100. In FIG. 1, the current user interface 100 is a contact interface, also referred to as an address book interface, and both the bottom modal view 110 and the bottom modal view 120 are creating-contact interfaces.

First information refers to information input into the terminal through the bottom modal view. In an embodiment, the first information may include at least one of the following information: contact information, schedule information, note information, timer information, path information, and mail information.

In some embodiments, when the first information is contact information, the bottom modal view can be used to create a new contact or modify a contact.

In some embodiments, when the first information is schedule information, the bottom modal view can be used to create an itinerary or modify an itinerary, or create a schedule.

In some embodiments, when the first information is note information, the bottom modal view can be used to create note information or modify note information.

Exemplarily, the information input method shown in embodiments of the present disclosure can be applied to the terminal with a display, and the terminal has a function of inputting information. The terminal can be a mobile phone, a tablet computer, a digital camera, a MP4 player terminal, a MP5 player terminal, a learning machine, a point reading machine, an e-paper, an electronic dictionary, or a vehicle-mounted terminal, and the like.

Figure 2:
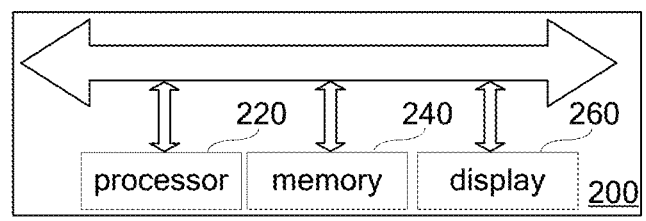
FIG. 2 is a structural block diagram of a terminal according to some exemplary embodiments of the present disclosure.

FIG. 2 is a structural block diagram of a terminal according to some exemplary embodiments of the present disclosure. As shown in FIG. 2, the terminal 200 includes a processor 220, a memory 240, and a display 260. The memory 240 is configured to store at least one instruction, and the instruction is configured to be loaded and executed by the processor 220 to implement the input information method as described in each of method embodiments of the present disclosure. The display 260 is used to display image data generated after a process of the processor 220.

In the present disclosure, a terminal 200 is an electronic apparatus with the function of inputting information. The terminal 200 is capable of displaying the bottom modal view on the current user interface, in response to receiving the first instruction configured to indicate the terminal 200 to enter a state for receiving the first information. The bottom modal view is the floating layer page displayed on the current user interface and includes a first input widget, an area of the bottom modal view being less than an area of the current user interface. The terminal 200 is also capable of inputting the first information based on an input signal in response to the first input widget being triggered, and the input signal is a signal input by a sensor of the terminal.

The processor 220 may include one or more processing cores. The processor 220 is configured to connect each of parts inside the entire terminal 200 via various interfaces and buses. The processor 220 is configured to execute various functions and process data of the terminal 200 by running or executing instructions, programs, code sets, or instruction sets stored in the memory 240 and by calling data stored in the memory 240. In some embodiments, the processor 220 may adopt at least one hardware form of Digital Signal Processing (DSP), Field-Programmable Gate Array (FPGA), Programmable Logic Array (PLA). The processor 220 may integrate one or a combination of one or more of the Central Processing Unit (CPU), Graphics Processing Unit (GPU), modem, and the like. The CPU is primarily used to process an operating system, the user interface, and application programs, etc.; the GPU is used to render and draw for the content to be displayed on the display; the modem is used to handle wireless communication. It can be understood that the above modem may also be not integrated into the processor 220, but be implemented through one chip separately.

The memory 240 may include a Random Access Memory (RAM), and may also include a Read-Only Memory (ROM). In some embodiments, the memory 240 includes a non-transitory computer-readable storage medium. The memory 240 may be used to store instructions, programs, code, code sets, or instruction sets. The memory 240 may include a program storage area and a data storage area, the program storage area may store instructions for implementing the operating system, instructions for at least one function (such as a touch control function, a sound playback function, an image playback function, etc.), instructions for implementing each of the method embodiments described below, etc. The data storage area may store data involved in each of the method embodiments described below, etc.

The display 260 is capable of displaying the image data that has been acquired from the memory 240 and rendered by the processor 220. In an embodiment, the processor 220 is configured to place the rendered image frames in a buffer queue, and the display 260 displays the image frames therein in sequence according to the order of the image frames in the buffer queue.

Figure 3:
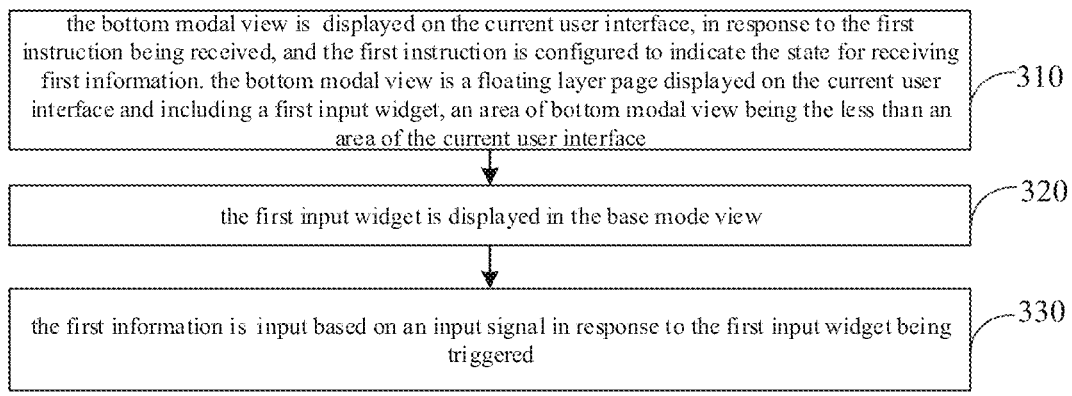
FIG. 3 is a flow chart of an information input method according to some exemplary embodiments of the present disclosure.

FIG. 3 is a flow chart of an information input method according to some exemplary embodiments of the present disclosure. The information input method may be applied to the terminal shown in FIG. 2. In FIG. 3, the information input method includes operations in the following.

In an operation 310, the bottom modal view is displayed on the current user interface, in response to the first instruction being received, and the first instruction is configured to indicate the state for receiving first information. The bottom modal view is a floating layer page displayed on the current user interface and including a first input widget, an area of bottom modal view being the less than an area of the current user interface.

In embodiments of the present disclosure, the terminal is generally able to initiate the application program to perform corresponding operations when executed normally. In some embodiments, the terminal is also able to provide corresponding functions in the user interface such as a main page (also known as a system page), a settings page, a notification bar page, or a negative screen. The user interface currently displayed in the terminal is collectively referred to as the current user interface.

When the terminal displays the current user interface, whether the first instruction is received may be monitored by the terminal, and the first instruction is configured to instruct the terminal to enter a state for receiving the first information. It should be noted that the first information is used to indicate information input into the terminal through the bottom modal view.

In an embodiment, the first instruction may be an instruction triggered by clicking a designated touch control in the current user interface. For example, when the current user interface is the current user interface 100 shown in FIG. 1, the designated touch control may be an entrance control 101. When the touch control with a plus sign shape, i.e. the entrance control 101, is clicked, the first instruction is triggered.

In another embodiment, the first instruction may also be an instruction triggered by a designated voice spoken by a voice assistant. For example, when the voice assistant of the terminal is in an active state and a voice of "create a contact" is heard, the voice will trigger the first instruction.

In yet another embodiment, the first instruction may also be an instruction triggered when an information carrier is selected. It should be noted that the information carrier may be at least one of multimedia files among pictures, text paragraphs, notes, and voice clips. In an embodiment, the information carrier may include information such as a name, contact numbers, or a schedule, and so on. For example, when a picture includes a name and contact numbers, and the terminal detects an operation of a user long-pressing the picture, the first instruction is triggered.

In the embodiments of the present disclosure, when the first instruction is received in the terminal, the bottom modal view will be displayed.

In an operation 320, the first input widget is displayed in the bottom modal view.

In the embodiments of the present disclosure, the terminal is capable of displaying the first input widget in the bottom modal view. That is, the bottom modal view includes the first input widget.

It should be noted that the first input widget is used to input the first information into the bottom modal view. The number of the first information may be one or multiple. For example, in the bottom modal view 120 shown in FIG. 1, the number of the first information is two, which are the name and the contact numbers. Correspondingly, the terminal displays two first input widgets in the bottom modal view 120, one of which is used to receive an input for a name, and the other of which is used to receive an input for the contact numbers.

In an operation 330, the first information is input based on an input signal in response to the first input widget being triggered.

In the embodiments of the present disclosure, the first information is input based on an input signal in the terminal when the first input widget is triggered, the input signal being a signal input into the terminal by a sensor of the terminal. In some embodiments, the input signal may be at least one of a touch signal, a voice signal, and an image signal.

In an embodiment, the first information may be input through a virtual keyboard. The input signal is a signal generated when virtual keys on the virtual keyboard is triggered. The terminal is capable of displaying the first information input in the first input widget based on the signal generated as the user presses the virtual keys on the virtual keyboard.

In another embodiment, the first information may be input through a voice button, and the input signal is voice information spoken by the user. The terminal is capable of performing a voice recognition process based on the voice information of the user, and displaying text data generated by the voice recognition process in the first input widget.

In yet another embodiment, the first information may be input through information provided by a specified picture, and the input signal is text data generated by an image recognition process for the specified picture. The terminal is capable of performing the image recognition process based on the specified picture, and displaying the text data generated in the first input widget.

Figure 4:
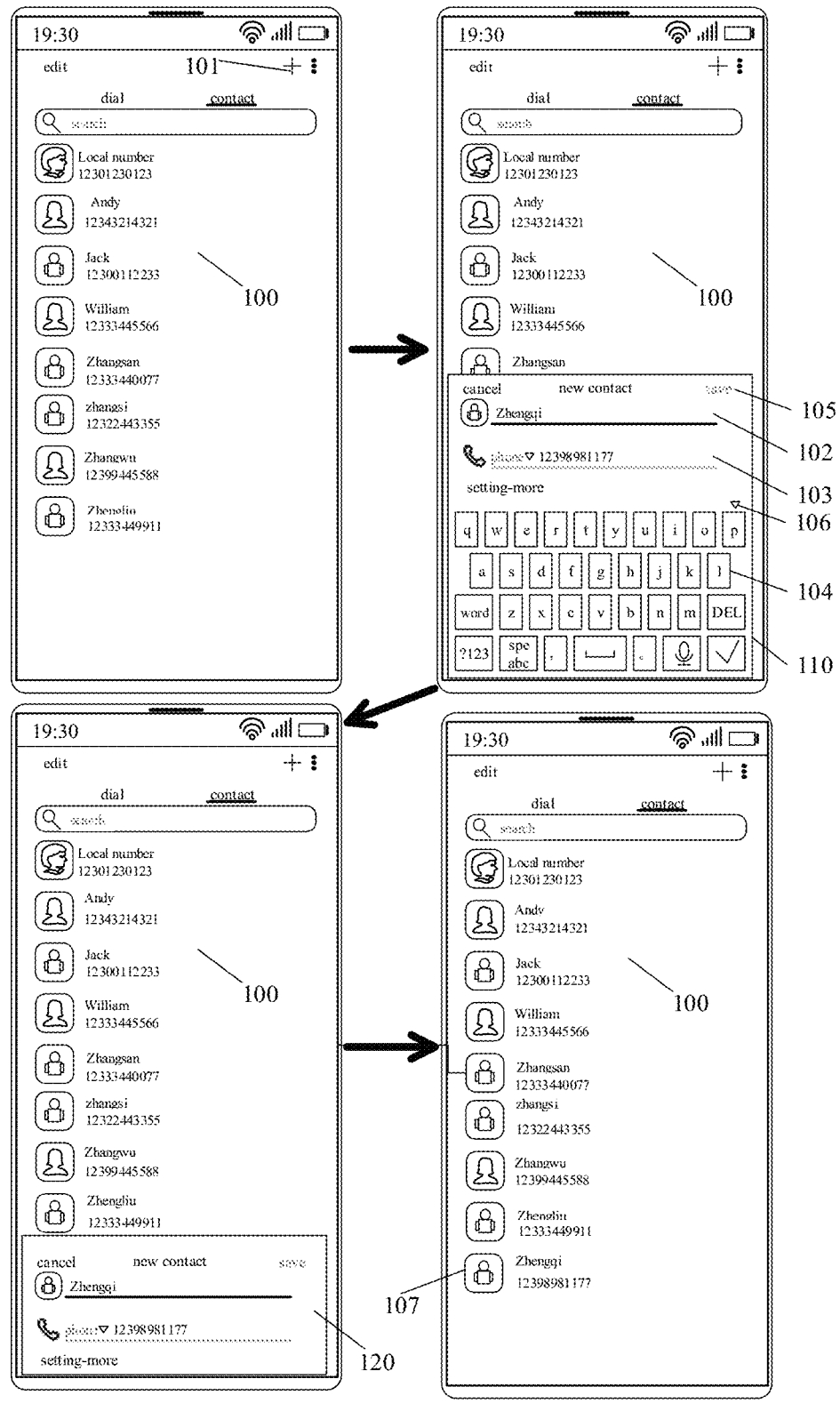
FIG. 4 is a schematic diagram of a process of inputting information in embodiments of FIG. 3.

For example, FIG. 4 is a schematic diagram of a process of inputting information in embodiments of FIG. 3. In FIG. 4, a full-screen is displayed on the terminal, that is, the current user interface 100 is displayed on the terminal. When the entrance control 101 is clicked, the bottom modal view 110 is displayed above the current user interface 100. Since a first row of the bottom modal view 110 is a first input widget 102 and the bottom modal view 110 includes a first input widget 103 at the same time, the virtual keyboard 104 may be displayed on the bottom modal view 110. When there is no input information in the first input widget 102 and the first input widget 103, a saving control 105 is in a non-selectable state and may be visually displayed in gray. When the first information has been input in the first input widget 102 and the first input widget 103, the saving control 105 is in a selectable state and may be visually displayed in black or color. When there is no need for the user to have the virtual keyboard 104 displayed any more, a retract button 106 may be clicked by the user. When the retract button 106 being triggered is detected, the virtual keyboard 104 is retracted and a displaying area of the bottom modal view 110 is adjusted to display the bottom modal view 120. It should be noted that a displaying height of the bottom modal view 120 on the screen may be less than a height of the bottom modal view 110. When the saving control 105 in the bottom modal view 120 is triggered, the name information in the first input widget 102 and the number information in the first input widget 103 are saved as a new contact. For example, in FIG. 4, the new contact may be a contact 107.

In an embodiment, the bottom modal view 110 and the bottom modal view 120 may have a setting-more button to be displayed thereon. When the user clicks the setting-more button, the user may input more information of a contact.

In an embodiment, the height of the bottom modal view 110 may be set freely. In some embodiments, the maximum height of the bottom modal view 110 may be 1962 px.

According to the information input method provided in embodiments of the present disclosure, the bottom modal view is displayed when the first instruction is received. The first instruction is used to instruct the terminal to enter the state for receiving the first information, the bottom modal view is the floating layer page displayed on the current user interface, and the area of the bottom modal view is less than the area of the current user interface. The first input widget is displayed in the bottom modal view. The first information is input based on the input signal when the first input widget is triggered, the input signal is the signal input into the terminal by the sensor of the terminal. Since the bottom modal view may be displayed on the current user interface, and the information may be input into the terminal by the bottom modal view, the efficiency of inputting information may be improved and users may input important information into the terminal quickly.

Based on solutions disclosed in the previous embodiments, the bottom modal view may be converted to other modal views under different operations, as shown in the following embodiments.

Figure 5:
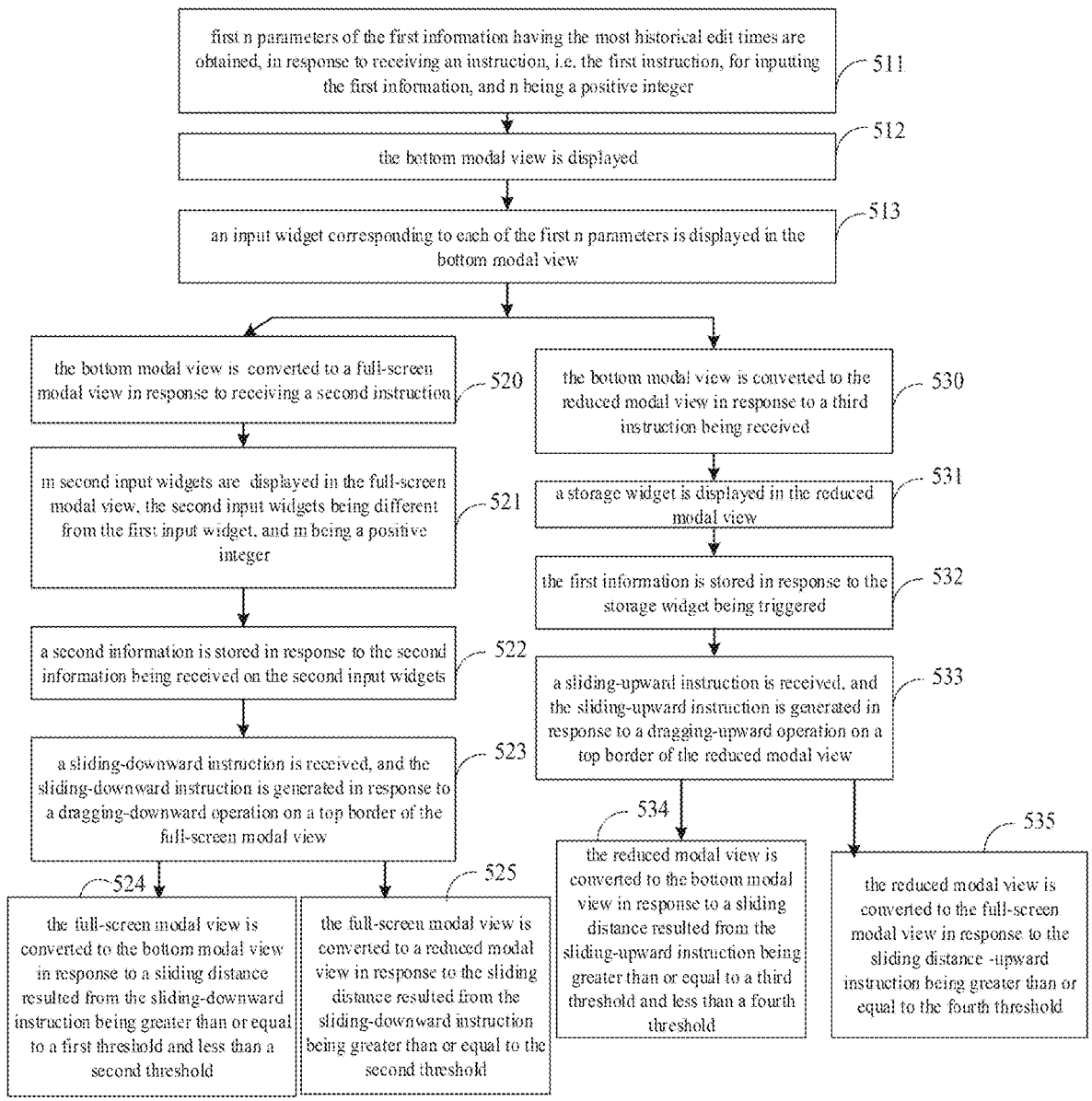
FIG. 5 is a flow chart of an information input method according to another exemplary embodiments of the present disclosure.

FIG. 5 is a flow chart of an information input method according to other exemplary embodiments of the present disclosure. The information input method may be applied to the terminal described above. In FIG. 5, the information input method includes:

In an operation 511, first n parameters of the first information having the most historical edit times are obtained, in response to receiving an instruction, i.e. the first instruction, for inputting the first information, n being a positive integer.

In an embodiment, when the instruction for inputting the first information is received, historical edit times of the first information are obtained. It should be noted that the historical edit times may involve a privacy of the user. Therefore, the terminal is required to ask for a permission from the user when the historical edit times are to be obtained. When the user permits the terminal to use the historical edit times, the historical edit times may be obtained.

In an embodiment, the historical edit times may be used to indicate a sum of editing times of each parameter of a respective object in the history. In some embodiments, Table 1 shows historical edit times in a case where an object is contact, and parameters of the object are a name, phone numbers, a company, and an instant messaging account.

TABLE 1

| | Parameters names | | | |
|---|---|---|---|---|
| | Name | Phone numbers | Company | Instant messaging account |
| historical edits times | 320 | 315 | 180 | 296 |

In a scenario where the contact is created in Table 1, the obtained historical edit times of the name is 320, the obtained historical edit times of the phone numbers is 315, the obtained historical edit times of the company is 180, and the obtained historical edit times of the instant messaging account is 296. When n is 2, two parameters of the name and the phone numbers are obtained.

Based on data shown in Table 1, when the terminal continues to be used, historical edit times are obtained again at a certain subsequent moment, and shown in Table 2.

TABLE 2

| | Parameters names | | | |
|---|---|---|---|---|
| | Name | Phone numbers | Company | Instant messaging account |
| historical edits times | 430 | 390 | 270 | 396 |

It can be seen from the data shown in Table 2 that during a continuing use of the terminal, when creating a contact, the user tends to bind the name with the instant messaging account. Therefore, according to the historical edit times shown in Table 2, the first 2 parameters with the most historical edit times are the name and the instant messaging account.

In an operation 512, the bottom modal view is displayed.

In the embodiments of the present disclosure, the bottom modal view will be displayed.

In an operation 513, an input widget corresponding to each of the first n parameters is displayed in the bottom modal view.

In embodiments of the present disclosure, the input widget corresponding to each of the n parameters is displayed in the bottom modal view. It should be noted that the n is obtained in the operation 511. That is, the bottom modal view includes n third input widgets, each of the third input widgets corresponds to a parameter of the first n parameters.

For example, when the n parameters are parameters obtained according to the data shown in Table 1 in the operation 511 and the n is 2, the input widgets are an input widget corresponding to the name and an input widget corresponding to the phone numbers.

For example, when the n parameters are parameters obtained according to the data shown in Table 2 in the operation 511 and the n is 2, the input widgets are an input widget corresponding to the name and an input widget corresponding to the instant messaging account.

In an embodiment, the input widget corresponding to each of the n parameters is displayed in the bottom modal view in response to n being less than an item number threshold, and the n parameters corresponding to the input widgets one to one.

It should be noted that, since a purpose of designing the bottom modal view is to lighten the input information of the users, a space provided in the bottom modal view is limited. When the bottom modal view is capable of displaying the input widgets with the number equal to an item number threshold, a determination is required. When the number n of parameters to be input is less than the item number threshold, the input widget corresponding to each of the n parameters is displayed in the bottom modal view. That is, the bottom modal view includes the n third input widgets, each of the third input widgets corresponds to a parameter of the first n parameters in response to n being less than a preset threshold, and the preset threshold indicates the number of widgets in the bottom modal view.

Based on the solution that the input widget corresponding to each of the n parameters is displayed in the bottom modal view in the present disclosure, the bottom modal view may also be adopted by applications installed in the terminal. In this way, an effect that functions with an excellent interactive performance may be shared by third-party applications may be realized.

In an operation 520, the bottom modal view is converted to a full-screen modal view in response to receiving a second instruction.

In the embodiments of the present disclosure, an area of the full-screen modal view is the same with the area of the current user interface, and the second instruction is an instruction triggered when a specified operation is received on the bottom modal view.

In an embodiment, the second instruction may be generated when a distance that a top area of the bottom modal view is slid upward exceeds a pull-up threshold. The pull-up threshold may be a preset value in the terminal. In some embodiments, the pull-up threshold may be 150 px.

It should be noted that the bottom modal view is converted to the full-screen modal view when the second instruction is received. During a conversion process, the bottom modal view may be converted to the full-screen modal with various animation effects. For example, the animation effect may be the animation effect of sliding-upward and popping up.

In another embodiment, a full-screen modal button may be displayed in the bottom modal view, and the bottom modal view may be controlled to be converted to the full-screen modal view in response to the full-screen modal button being triggered. That is, the bottom modal view includes a full-screen modal button, and the bottom modal view is converted to the full-screen modal view in response to the full-screen modal button being triggered.

Figure 6:
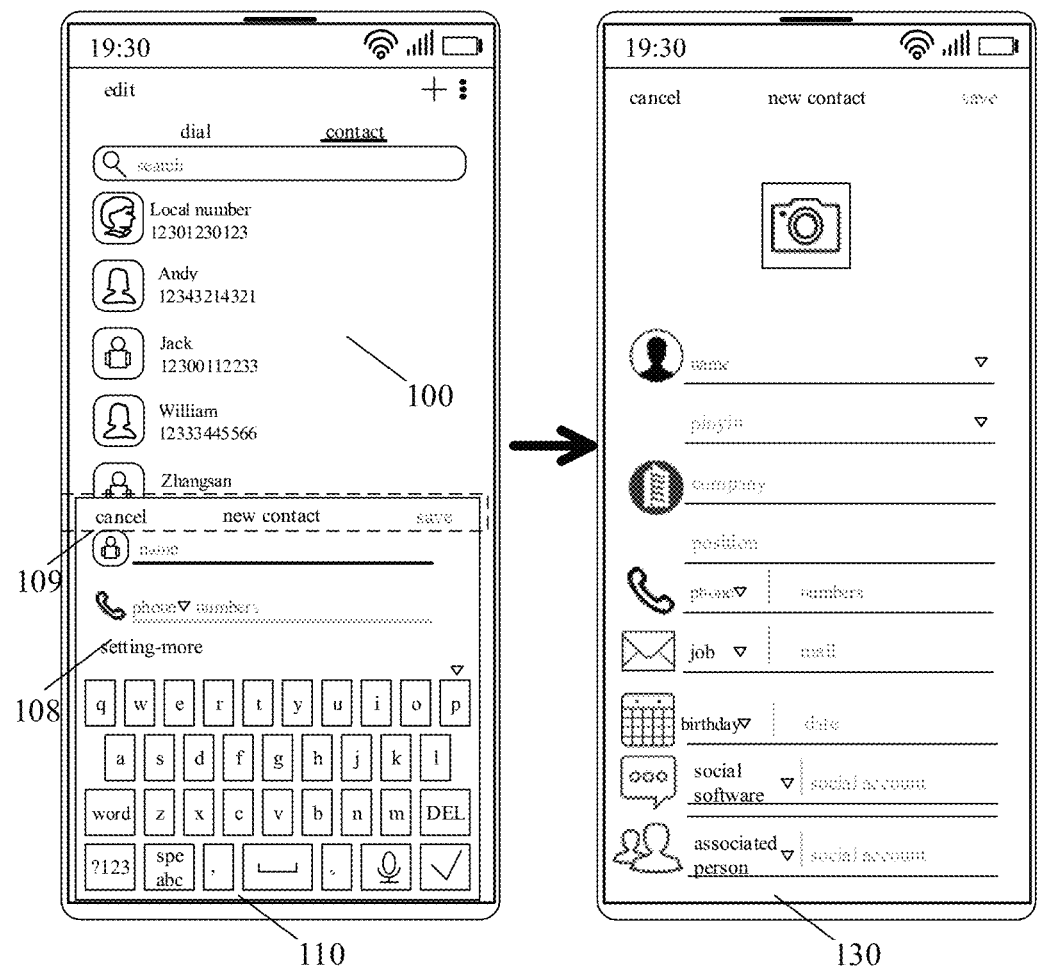
FIG. 6 is a schematic diagram of opening a full-screen modal view according to embodiments of FIG. 5.

FIG. 6 is a schematic diagram of opening a full-screen modal view according to embodiments of FIG. 5. In FIG. 6, when the full-screen modal button 108 in the bottom modal view 110 is clicked and triggered, the bottom modal view 110 will be converted to the full-screen modal view 130.

In FIG. 6, another method of converting the bottom modal view 110 to the full-screen modal view 130 is that the full-screen modal view 130 will be displayed in an upper layer of the current user interface 100 when a distance that a top area 109 of the bottom modal view 110 is slid upward exceeds the pull-up threshold 150 px.

In the embodiments of the present disclosure, when the distance that the top area 109 of the bottom modal view 110 is slid upward exceeds the pull-up threshold 150 px, the virtual keyboard in the bottom modal view 110 may be folded firstly, and the full-screen modal view 130 may be unfolded in an animation effect, that is, the bottom modal view 110 is converted to the full-screen modal view 130. When the bottom modal view 110 is converted to the unfolded full-screen modal view 130, the first information that has been input is retained, and a corresponding part is unfolded for the user to continue inputting corresponding information.

In an operation 521, m second input widgets are displayed in the full-screen modal view, the second input widgets being different from the first input widget, and m being a positive integer.

In the embodiments of the present disclosure, m second input widgets may be displayed in the full-screen modal view in the terminal, and the second input widgets are different from the first input widget. In an embodiment, the second input widget have a function which is similar to that of the first input widgets and is for the user to input the information. A difference between the first input widgets and the second input widgets is that the first input widgets are displayed in the bottom modal view and the second input widgets are displayed in the full-screen modal view.

In an example of FIG. 6, the input widgets corresponding to the name and the phone numbers are the first input widgets, and the input widgets corresponding to a pinyin of the name, a company, a position, a job, a birthday, a social software, and an associated person are the second input widgets.

In an operation 522, a second information is stored in response to the second information being received on the second input widgets.

In the embodiments of the present disclosure, the second information newly input in the full-screen modal view may be stored in the terminal. In an example of FIG. 6, the second information includes the pinyin of the name, the company, the position, the job, the birthday, the social software, and the associated person.

In an operation 523, a sliding-downward instruction is received, and the sliding-downward instruction is generated in response to a dragging-downward operation on a top border of the full-screen modal view.

In the embodiments of the present disclosure, when the top border of the full-screen modal view is subjected to a dragging-downward operation, the sliding-downward instruction is generated.

In an operation 524, the full-screen modal view is converted to the bottom modal view in response to a sliding distance resulted from the sliding-downward instruction being greater than or equal to a first threshold and less than a second threshold.

In the embodiments of the present disclosure, when the sliding distance corresponding to the sliding-downward instruction is greater than or equal to the first threshold and less than the second threshold, the full-screen modal view is converted to the bottom modal view.

In an embodiment, the first threshold is proportional to the second threshold. For example, the second threshold may be k times the first threshold, and k is an integer greater than 1.

In another embodiment, the second threshold may be just required to be greater than the first threshold.

In an operation 525, the full-screen modal view is converted to a reduced modal view in response to the sliding distance resulted from the sliding-downward instruction being greater than or equal to the second threshold.

In the embodiments shown in the present disclosure, an area of the reduced modal view is less than the area of the bottom modal view. In an embodiment, the reduced modal view may be the top area in the bottom modal view. For example, in an example of FIG. 6, the top area 109 in the bottom modal view 110 may be separately displayed as the reduced modal view.

In an operation 530, the bottom modal view is converted to the reduced modal view in response to a third instruction being received.

In the embodiments shown in the present disclosure, the area of the reduced modal view is less than the area of the bottom modal view.

In some embodiments, the third instruction may be an instruction triggered when a distance that the top area of the bottom modal view is pressed and then slid down exceeds a specified distance.

Figure 7:
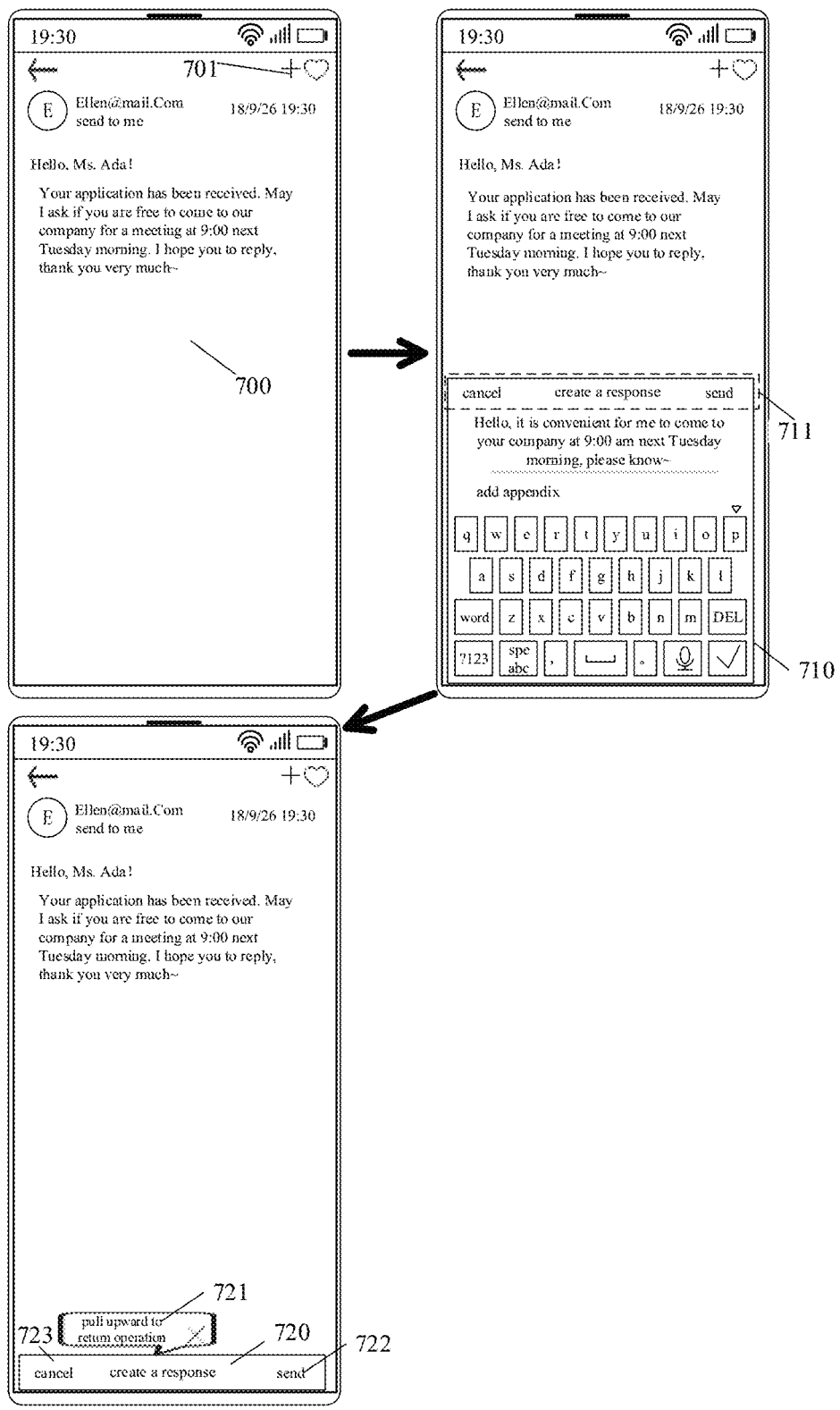
FIG. 7 is a schematic diagram of a reduced modal view according to the embodiments of FIG. 5.

FIG. 7 is a schematic diagram of a reduced modal view according to the embodiments of FIG. 5. In FIG. 7, the bottom modal view 710 may be displayed in the terminal when a creating-mail button 701 in the current user interface 700 is triggered. When a distance that the top area 711 of the bottom modal view 710 is pressed and dragged downward exceeds 150 px, the bottom modal view 710 is converted to the reduced modal view 720.

In some embodiments, when the reduced modal view 720 is displayed in the current user interface 700 for the first time, prompt information 721 may be displayed near the reduced modal view 720 of the current user interface 700. The prompt information 721 is used to prompt how to return to the bottom modal view 710 from the reduced modal view 720. For example, in the bottom modal view 710, the prompt information 721 is displayed as "pull upward to return operation". The reduced modal view 720 includes a sending control 722 and a cancel control 723.

In an operation 531, a storage widget is displayed in the reduced modal view.

In the embodiments shown in the present disclosure, the storage widget is displayed in the reduced modal view.

In an operation 532, the first information is stored in response to the storage widget being triggered.

In the embodiments shown in the present disclosure, the first information is stored when the storage widget is triggered.

In another embodiment, the sending control is displayed in the reduced modal view, and when the sending control is triggered, the first information is sent.

In an operation 533, a sliding-upward instruction is received, and the sliding-upward instruction is generated in response to a dragging-upward operation on a top border of the reduced modal view.

In an operation 534, the reduced modal view is converted to the bottom modal view in response to a sliding distance resulted from the sliding-upward instruction being greater than or equal to a third threshold and less than a fourth threshold.

In an embodiment, the third threshold is proportional to the fourth threshold. For example, the fourth threshold may be L times the third threshold, and L is an integer greater than 1.

In another embodiment, the fourth threshold may be just required to be greater than the third threshold.

In an operation 535, the reduced modal view is converted to the full-screen modal view in response to the sliding distance resulted from the sliding-upward instruction being greater than or equal to the fourth threshold.

Figure 8:
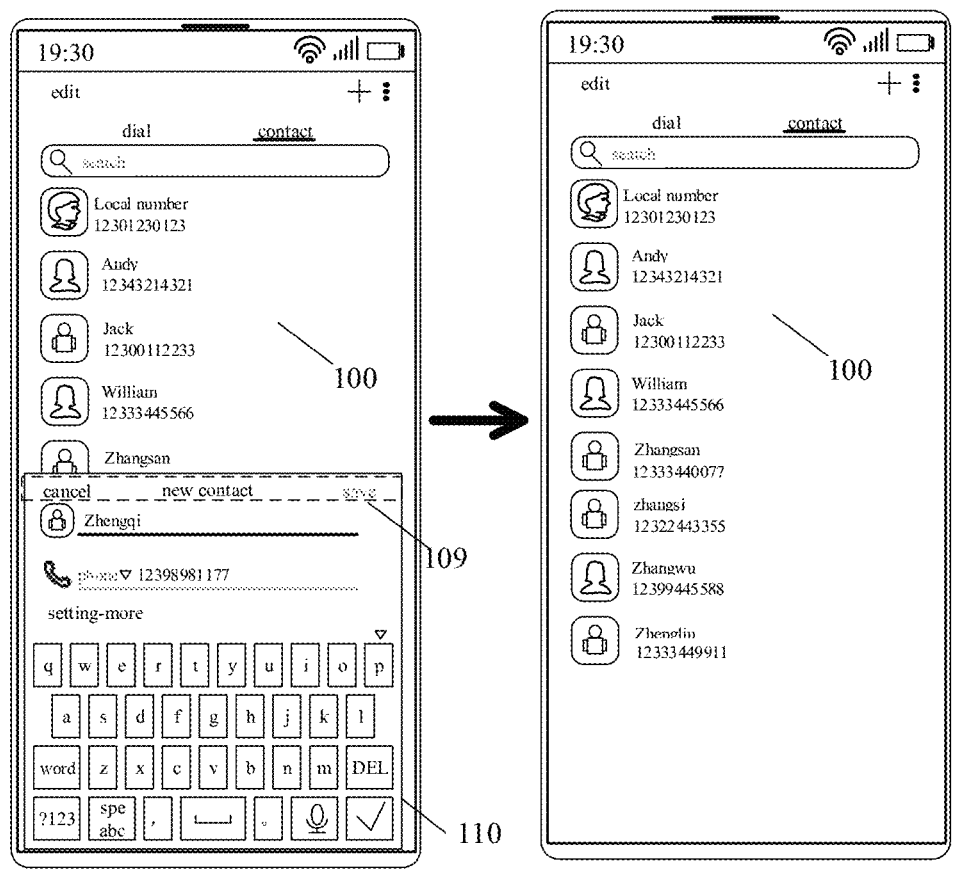
FIG. 8 is a schematic diagram of closing a bottom modal view according to the embodiments of FIG. 5.

Based on embodiments above in the present disclosure, the bottom modal view may also be closed after the bottom modal view is displayed. FIG. 8 is a schematic diagram of closing a bottom modal view according to the embodiments of FIG. 5. In FIG. 8, when a distance that the top area 109 of the bottom modal view 110 is pressed and dragged downward exceeds 150 px, the bottom modal view 110 is closed in the terminal, and the current user interface 100 is returned to be displayed in full-screen.

Based on embodiments above, in the present disclosure, the bottom modal view may also be converted to other modal views in two ways. i.e. a fixed region and a flexible region. The other modal views include the full-screen modal view and the reduced modal view.

Figure 9:
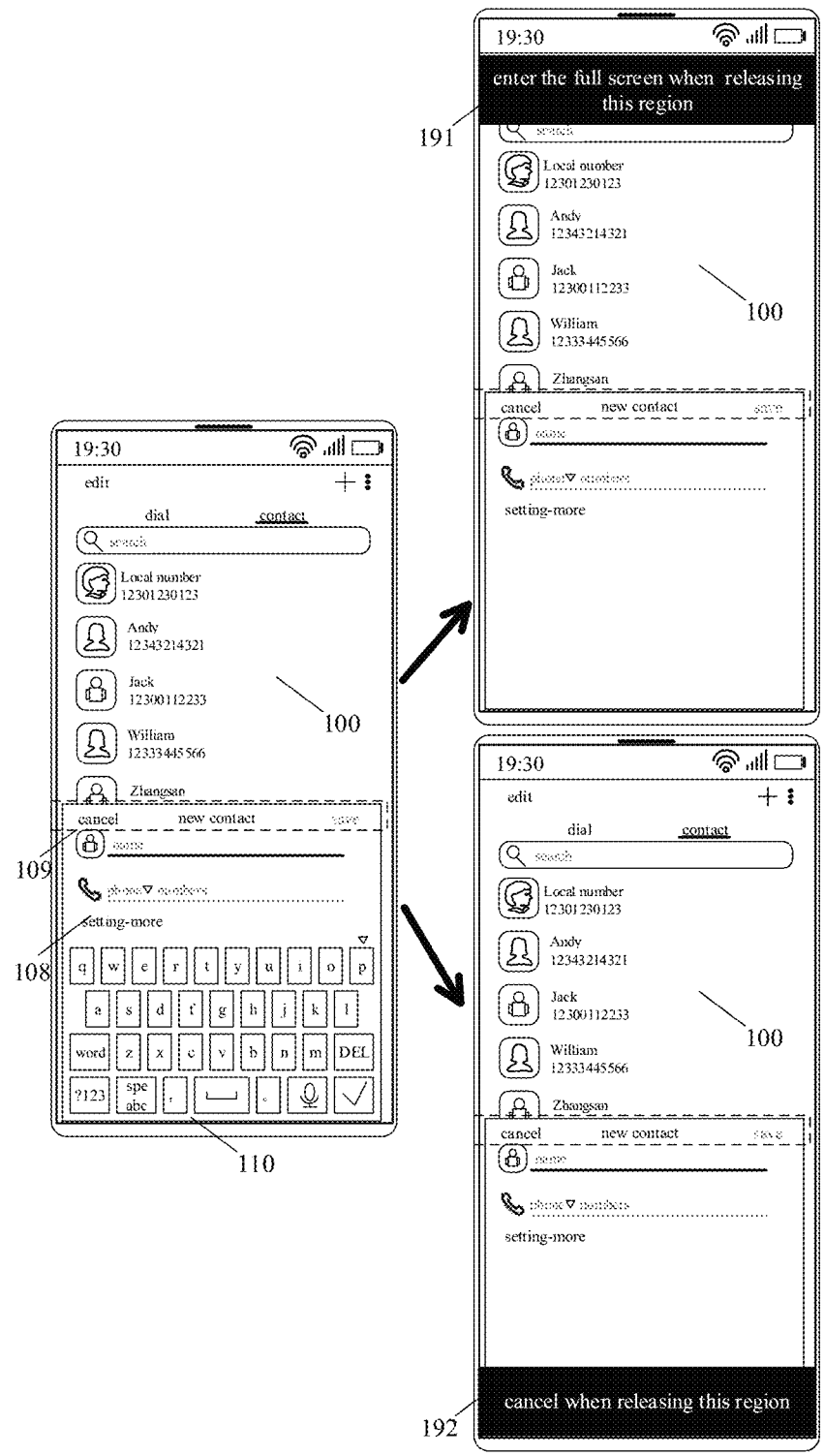
FIG. 9 is a schematic diagram of conversion of the bottom modal view in a manner of a fixed region according to the embodiments of FIG. 5.

FIG. 9 is a schematic diagram of conversion of the bottom modal view in a manner of a fixed region according to the embodiments of FIG. 5

In an embodiment of FIG. 9, when a distance that the top area 109 of the bottom modal view 110 is dragged upward exceeds 150 px, a prompt information "enter the full screen when releasing this region" is displayed in an area 191 of the current user interface 100. When the area 191 is released by fingers of a user, the bottom modal view 110 will be converted to the full-screen modal view.

In another embodiment of FIG. 9, when a distance that the top area 109 of the bottom modal view 110 is dragged downward exceeds 150 px, a prompt information "cancel when releasing this region" is displayed in an area 192 of the current user interface 100. When the area 192 is released by fingers of a user, the bottom modal view 110 will be hided, and the current user interface 100 will be returned to be displayed in full-screen.

Figure 10:
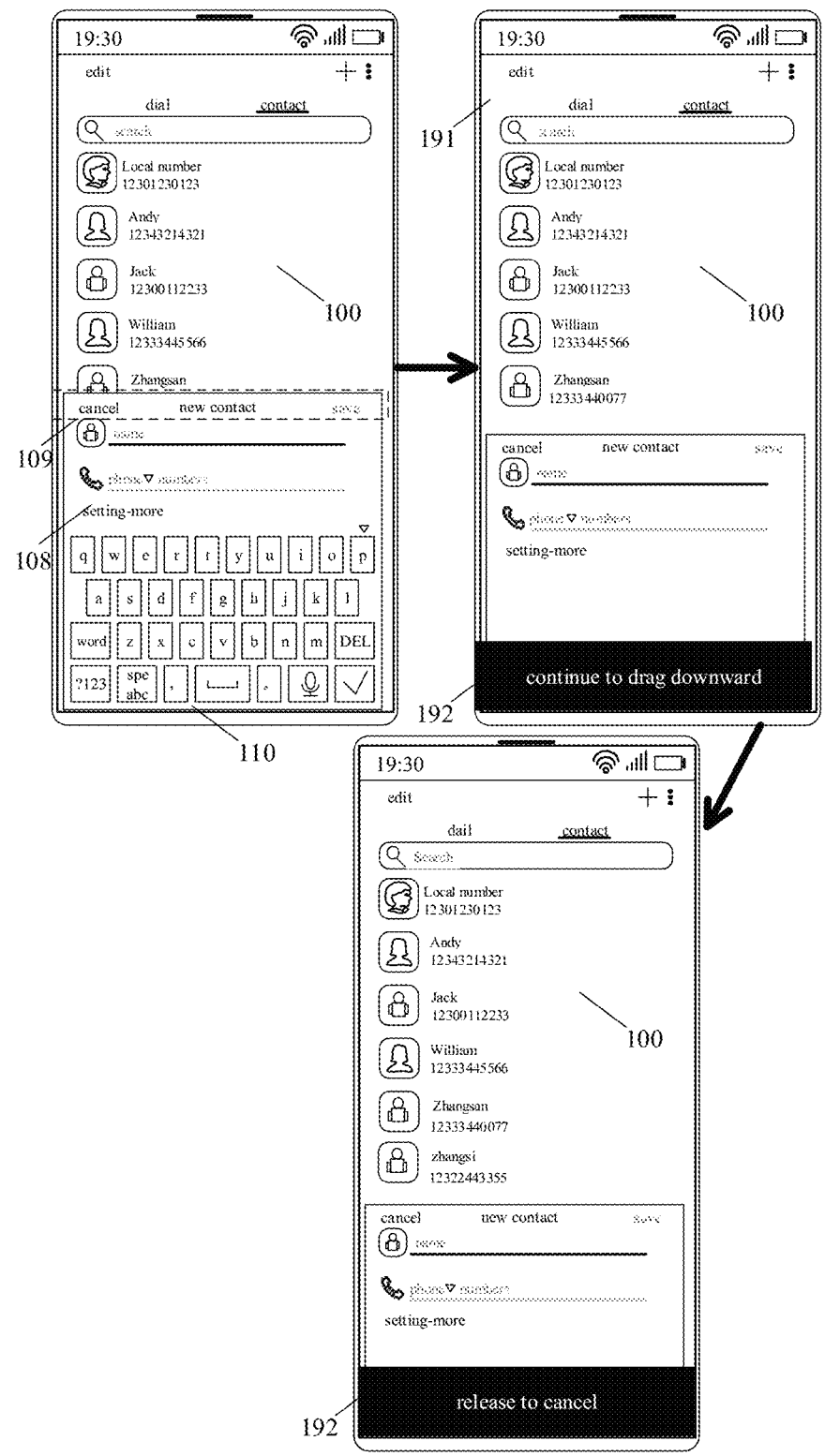
FIG. 10 is a schematic diagram of conversion of the bottom modal view in a manner of a flexible region according to the embodiments of FIG. 5.

FIG. 10 is a schematic diagram of conversion of the bottom modal view in a manner of a flexible region according to the embodiments of FIG. 5. In the flexible cancelling way shown in FIG. 10, a cancelling distance threshold is preset in advance.

When the distance that the top area 109 of the bottom modal view 110 is dragged downward is less than the cancelling distance threshold, a prompt information "continue to drag downward" is displayed in the area 192 of the current user interface 100. In this case, when the fingers of the user release, the bottom modal view 110 will be hided, and the current user interface 100 will be returned to be displayed in full-screen in the terminal.

When the distance that the top area 109 of the bottom modal view 110 is dragged downward is greater than or equal to the cancelling distance threshold, a prompt information "release to cancel" is displayed in the area 192 of the current user interface 100. In this case, when the fingers of the user release, the bottom modal view 110 will be returned to be displayed in the terminal.

Based on the embodiment provided in FIG. 5, the following application scenarios may also be provided and include a creating-schedule scenario, a creating-note scenario, a timer setting scenario, and a target path selection scenario, which will be illustrated below in conjunction with the accompanying drawings.

Figure 11:
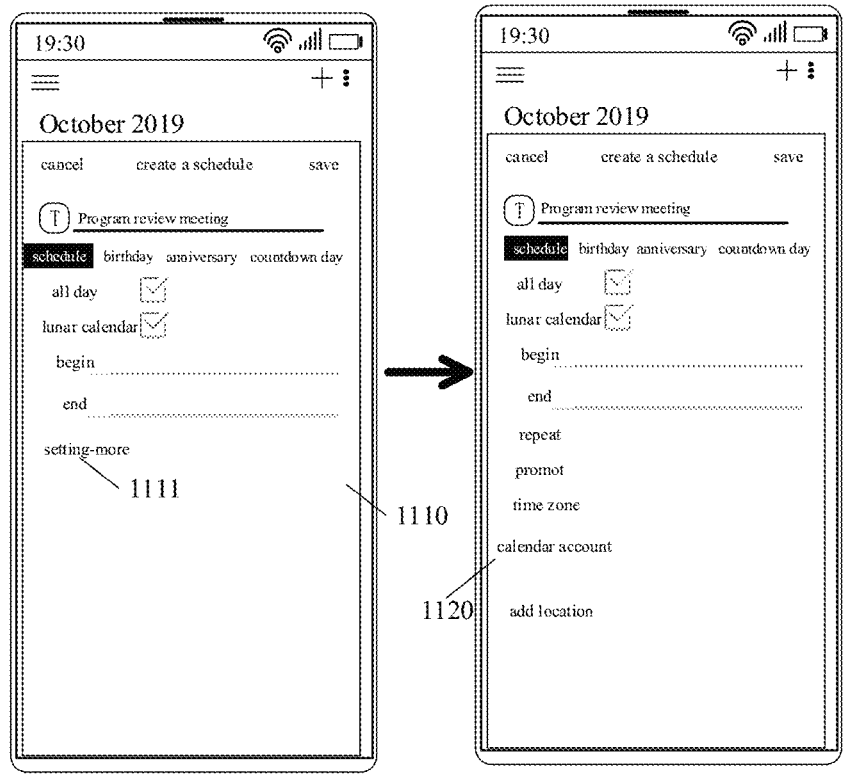
FIG. 11 is a schematic diagram of creating a schedule according to the embodiments of FIG. 5.

FIG. 11 is a schematic diagram of creating a schedule according to the embodiments of FIG. 5. In FIG. 11, the first information is input in the bottom modal view 1110. When the setting-more button 1111 in the bottom modal view 1110 is triggered, the bottom modal view 1110 is converted to the full-screen modal view 1120 for the user to continue to input the second information to complete a schedule to be created.

Figure 12:
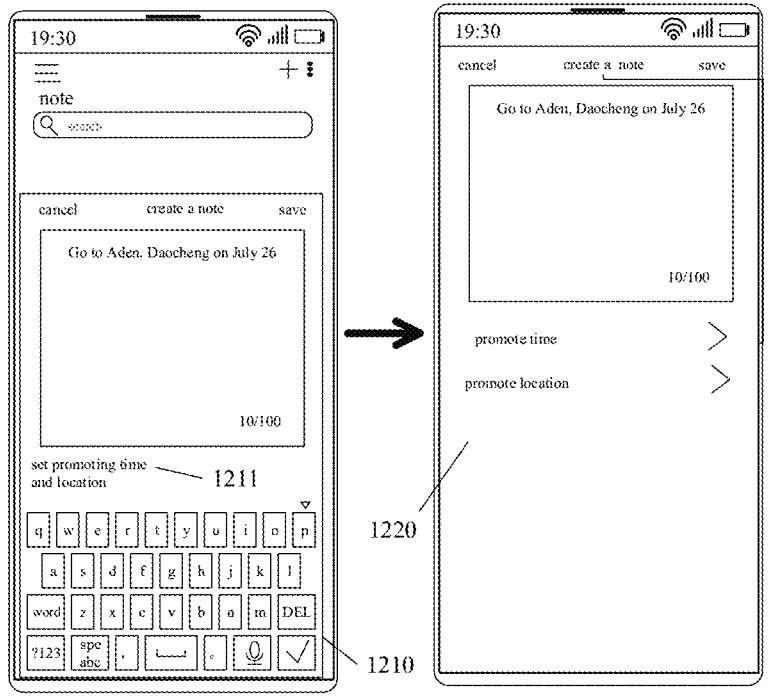
FIG. 12 is a schematic diagram of creating a note according to the embodiments of FIG. 5.

FIG. 12 is a schematic diagram of creating a note according to the embodiments of FIG. 5. In FIG. 12, the first information is input in the bottom modal view 1210. When a button 1211 for setting time and location in the bottom modal view 1210 is triggered, the bottom modal view 1210 is converted to the full-screen modal view 1220 for the user to continue to input the second information to complete a note to be created.

Figure 13:
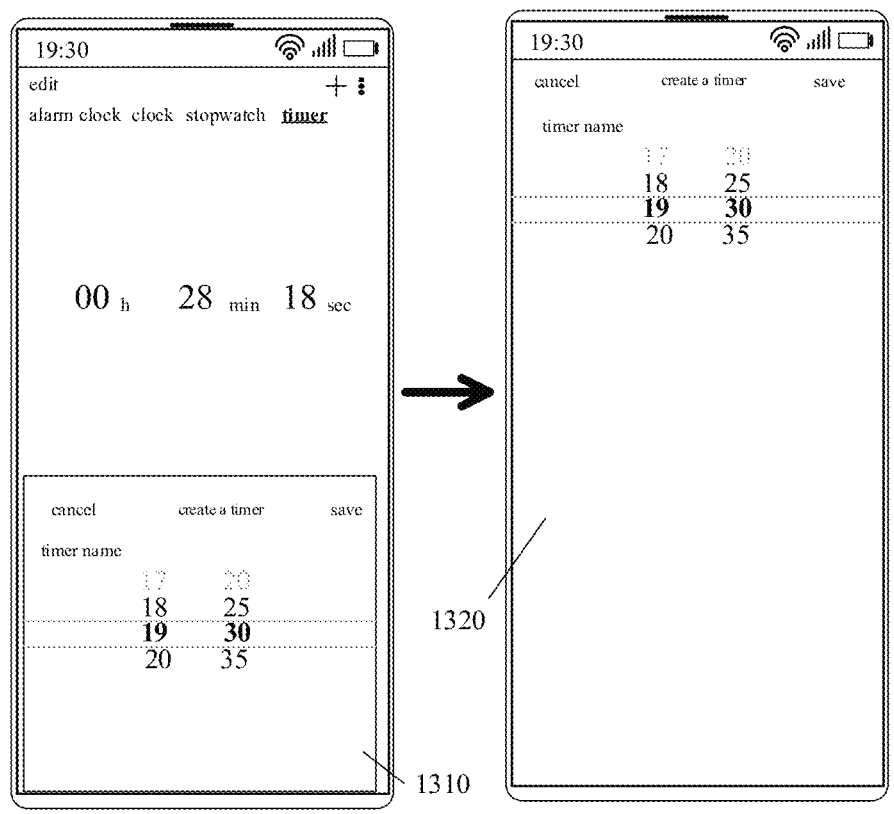
FIG. 13 is a schematic diagram of setting a timer according to the embodiments of FIG. 5.

FIG. 13 is a schematic diagram of setting a timer according to the embodiments of FIG. 5. In FIG. 13, time of the timer is set in the bottom modal view 1310 in the terminal. Compared to a full-screen user interface 1320 in which the timer is set, the time of the timer being set in the bottom modal view 1310 may be more convenient.

In an application scenario of the bottom modal view provided in the present disclosure, the bottom modal view may also be used for selecting a storage path of a target object. In the application scenario, the first instruction is an instruction for selecting the storage path of the target object, and the target object is an object displayed in the current user interface.

Figure 14:
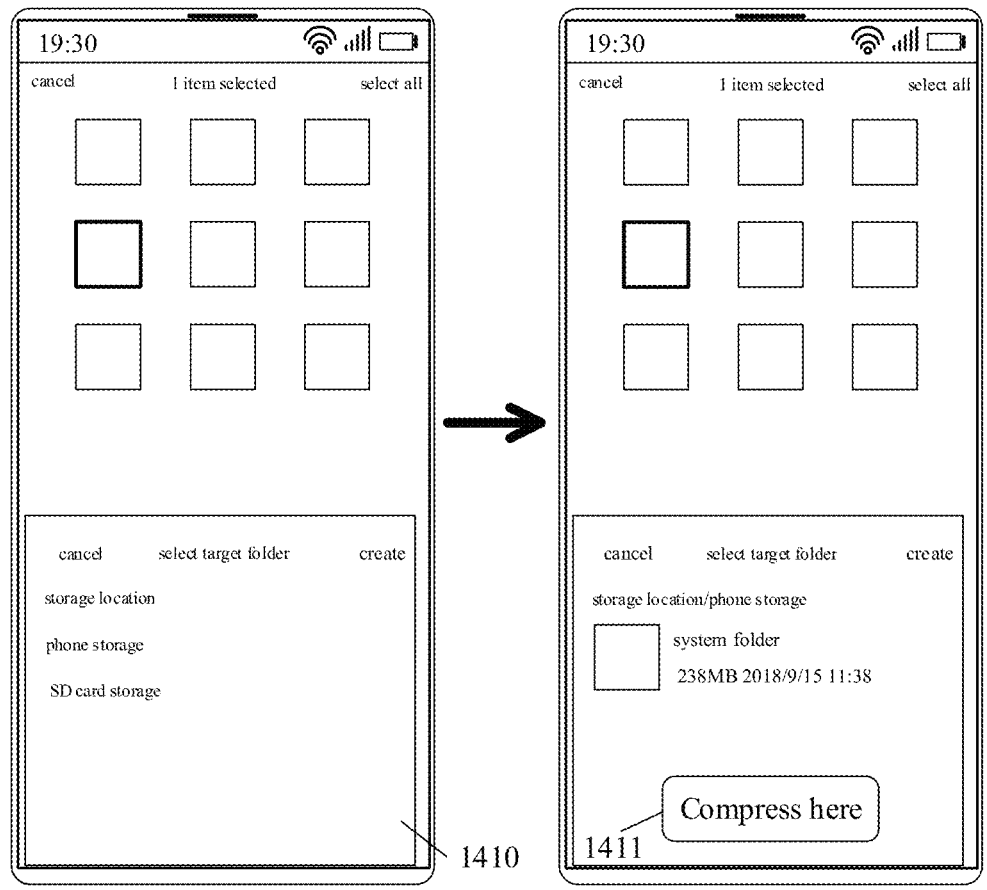
FIG. 14 is a schematic diagram of selecting a target path according to the embodiments of FIG. 5.

FIG. 14 is a schematic diagram of selecting a target path according to the embodiments of FIG. 5. In FIG. 14, paths of files that the user intend to compress are displayed in the bottom modal view 1410 in the terminal. When levels selected by the user meet requirements of the paths, a completion button 1411 will be displayed in the bottom modal view 1410, and a prompt information "compress here" may be displayed in the completion button 1411.

In conclusion, in the present disclosure, the bottom modal view may be displayed in the current user interface, and the bottom modal view may be converted to the full-screen modal view or the reduced modal view quickly, such that information inputting may be finished quickly in the terminal through conversions between various modal views without changing the current user interface. In this way, the efficiency of inputting information to the terminal or performing a setting process may be improved.

Apparatus embodiments of the present disclosure are described in the following and may be used to implement the method embodiments of the present disclosure. For details that are not disclosed in the apparatus embodiments of the present disclosure, may refer to the method embodiments of the present disclosure.

Figure 15:
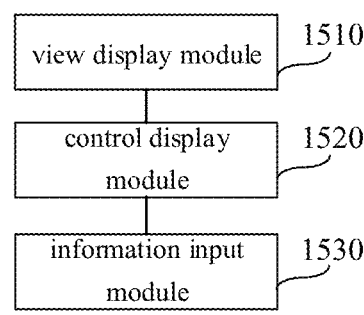
FIG. 15 is a structural block diagram of an apparatus for information input according to some exemplary embodiments of the present disclosure.

FIG. 15 is a structural block diagram of an apparatus for information input according to some exemplary embodiments of the present disclosure. The apparatus for inputting information may be all or a part of a terminal through a software, a hardware or a combination of the software and the hardware. The apparatus includes the following.

A view display module 1510 is configured to display a bottom modal view on a current user interface in response to a first instruction being received, the first instruction configured to indicate a terminal to enter a state for receiving first information. The bottom modal view is a floating layer page displayed on the current user interface and comprising a first input widget, an area of the bottom modal view being less than an area of the current user interface.

A control display module 1520 is configured to display a first input widget in the bottom modal view.

An information input module 1530 is configured to input the first information based on an input signal in response to the first input widget being triggered.

In an embodiment, the apparatus further includes a first conversion module, configured to convert the bottom modal view to a full-screen modal view in response to a second instruction being received. An area of the full-screen modal view is same with the area of the current user interface, and the second instruction is an instruction triggered in response to a specified operation being performed on the bottom modal view; and a second conversion module, configured to convert the bottom modal view to a reduced modal view in response to a third instruction being received. An area of the reduced modal view is less than the area of the bottom modal view.

In an embodiment, the apparatus further includes an execution module, configured to display m second input widgets in the full-screen modal view, the second input widgets being different from the first input widget, and m being a positive integer; and store a second information in response to receiving the entered second information on the second input widgets.

In an embodiment, the execution module is further configured to receive a sliding-downward instruction generated in response to a dragging-downward operation on a top border of the full-screen modal view; convert the full-screen modal view to the bottom modal view in response to a sliding distance resulted from the sliding-downward instruction being greater than or equal to a first threshold and less than a second threshold; and convert the full-screen modal view to the reduced modal view in response to the sliding distance resulted from the sliding-downward instruction being greater than or equal to the second threshold.

In an embodiment, the execution module is further configured to display a storage widget in the reduced modal view; and store the first information in response to the storage widget being triggered.

In an embodiment, the execution module is further configured to receive a sliding-upward instruction generated in response to a dragging-upward operation on a top border of the reduced modal view; convert the reduced modal view to the bottom modal view in response to a sliding distance resulted from the sliding-upward instruction being greater than or equal to a third threshold and less than a fourth threshold; and convert the reduced modal view to the full-screen modal view in response to the sliding distance resulted from the sliding-upward instruction being greater than or equal to the fourth threshold.

In an embodiment, the bottom modal view includes a full-screen modal button, the first conversion module is configured to convert the bottom modal view to the full-screen modal view in response to the full-screen modal button being triggered.

In an embodiment, the view display module 1510 is configured to obtain first n parameters of the first information having the most historical edit times, in response to an instruction to input the first information being received, and n being a positive integer; display the bottom modal view; and display an input widget corresponding to each of the n parameters in the bottom modal view. That is, the first information has first n parameters having the most historical edit times, the bottom modal view comprises n third input widgets, and each of the third input widgets corresponds to a parameter of the first n parameters.

In an embodiment, the view display module 1510 is configured to display the input widget corresponding to each of then parameters in the bottom modal view in response to n being less than an item number threshold, and the n parameters corresponding to the input widgets one to one. That is, each of the third input widgets corresponds to the parameter of the first n parameters in response to n being less than a preset threshold, and the preset threshold indicates a number of widgets in the bottom modal view.

In an embodiment, the first instruction involved in the apparatus is an instruction for selecting a storage path of a target object, and the target object is an object displayed in the current user interface.

In an embodiment, the first information involved in the apparatus includes at least one of: contact information, schedule information, note information, timer information, path information, and mail information.

In the present embodiment, a non-transitory computer-readable storage medium is also provided and configured to store program instructions, and the program instructions are configured to implement the information input method as described in each of the above embodiments when loaded and executed by a processor.

It should be noted that when the information input apparatus provided in the above embodiments executes the information input method, a division of each of the above function modules is only taken as an example for illustration. In practical applications, the above functions corresponding to each of the above function modules may be assigned to different function modules to complete according to needs. That is, an internal structure of the apparatus is divided into different function modules to complete all or part of the functions described above. In addition, the information input apparatus and the information input method provided in the above embodiments belong to the same concept, and a specific implementation process is detailed in the method embodiments, which will not be repeated here.

Serial numbers of the embodiments of the present disclosure are only for description, and do not represent the superiority or inferiority of the embodiments.

Those of ordinary skill in the art can understand that all or part of the operations of the above embodiments may be implemented by the hardware, or by a program instructing relevant hardware to be completed. The program may be stored in a non-transitory computer-readable storage medium. The non-transitory computer-readable storage medium mentioned above may be a read-only memory, a magnetic disk or an optical disk, etc.

The description above are only exemplary embodiments that can be implemented of the present disclosure, and are not intended to limit the present disclosure. Any modification, equivalent replacement, improvement, etc. made within a spirit and a principle of the present disclosure shall be included in a protection scope of the present disclosure.

What is claimed is:

1. An information input method, comprising:
displaying a bottom modal view on a current user interface, in response to receiving a first instruction configured to indicate a state for receiving first information, the bottom modal view being a floating layer page displayed on the current user interface and comprising a first input widget, an area of the bottom modal view being less than an area of the current user interface;
inputting the first information based on an input signal in response to the first input widget being triggered;
converting the bottom modal view to a full-screen modal view in response to receiving a second instruction, an area of the full-screen modal view being same with the area of the current user interface, and the second instruction being triggered in response to a specified operation being performed on the bottom modal view;
displaying m second input widgets in the full-screen modal view, the second input widgets being different from the first input widget, and m being a positive integer; and
storing a second information in response to receiving the second information on the second input widgets.

2. The method as claimed in claim 1, after the displaying a bottom modal view on a current user interface, in response to receiving a first instruction, the method further comprising:
converting the bottom modal view to a reduced modal view in response to receiving a third instruction, an area of the reduced modal view being less than the area of the bottom modal view.

3. The method as claimed in claim 2, after the converting the bottom modal view to a full-screen modal view, the method further comprising:
receiving a sliding-downward instruction generated in response to a dragging-downward operation on a top border of the full-screen modal view;
converting the full-screen modal view to the bottom modal view in response to a sliding distance resulted from the sliding-downward instruction being greater than or equal to a first threshold and less than a second threshold; and
converting the full-screen modal view to the reduced modal view in response to the sliding distance resulted from the sliding-downward instruction being greater than or equal to the second threshold.

4. The method as claimed in claim 2, after the converting the bottom modal view to a reduced modal view, the method further comprising:
displaying a storage widget in the reduced modal view; and
storing the first information in response to the storage widget being triggered.

5. The method as claimed in claim 4, after the converting the bottom modal view to a reduced modal view, the method further comprising:
receiving a sliding-upward instruction generated in response to a dragging-upward operation on a top border of the reduced modal view;
converting the reduced modal view to the bottom modal view in response to a sliding distance resulted from the sliding-upward instruction being greater than or equal to a third threshold and less than a fourth threshold; and
converting the reduced modal view to the full-screen modal view in response to the sliding distance resulted from the sliding-upward instruction being greater than or equal to the fourth threshold.

6. The method as claimed in claim 2, wherein the bottom modal view comprises a full-screen modal button,
the converting the bottom modal view to a full-screen modal view in response to receiving a second instruction, comprises:
converting the bottom modal view to the full-screen modal view in response to the full-screen modal button being triggered.

7. The method as claimed in claim 1, wherein the first information has first n parameters having the most historical edit times, the bottom modal view comprises n third input widgets, and each of the third input widgets corresponds to a parameter of the first n parameters.

8. The method as claimed in claim 7, wherein each of the third input widgets corresponds to the parameter of the first n parameters in response to n being less than a preset threshold, and the preset threshold indicates the number of widgets in the bottom modal view.

9. The method as claimed in claim 1, wherein the first instruction is an instruction for selecting a storage path of a target object, and the target object is an object displayed in the current user interface.

10. The method as claimed in claim 1, wherein the first information comprises at least one of:
contact information, schedule information, note information, timer information, path information, and mail information.

11. A terminal, comprising:
a screen;
a processor; and
a memory connected to the processor and storing program instructions, wherein when the program instructions executed by the processor, causing the processor to perform operations of:
instructing the screen to display a bottom modal view on a current user interface, in response to receiving a first instruction configured to indicate the terminal to receive first information, the bottom modal view being a floating layer page displayed on the current user interface and comprising a first input widget, an area of the bottom modal view being less than an area of the current user interface;
inputting the first information based on an input signal in response to the first input widget being triggered;
converting the bottom modal view to a full-screen modal view in response to receiving a second instruction, an area of the full-screen modal view being same with the area of the current user interface, and the second instruction being an instruction triggered in response to a specified operation being performed on the bottom modal view;
instructing the screen to display m second input widgets in the full-screen modal view, the second input widgets being different from the first input widget, and m being a positive integer; and
storing a second information in the terminal in response to receiving the second information on the second input widgets.

12. The terminal as claimed in claim 11, wherein the processor is further configured to implement operations of:
converting the bottom modal view to a reduced modal view in response to receiving a third instruction, an area of the reduced modal view being less than the area of the bottom modal view.

13. The terminal as claimed in claim 12, wherein the processor is further configured to implement operations of:
receiving a sliding-downward instruction generated in response to a dragging-downward operation on a top border of the full-screen modal view;
converting the full-screen modal view to the bottom modal view in response to a sliding distance resulted from the sliding-downward instruction being greater than or equal to a first threshold and less than a second threshold; and
converting the full-screen modal view to the reduced modal view in response to the sliding distance resulted from the sliding-downward instruction being greater than or equal to the second threshold.

14. The terminal as claimed in claim 12, wherein the processor is further configured to implement operations of:
instructing the screen to display a storage widget in the reduced modal view; and
storing the first information in response to the storage widget being triggered.

15. The terminal as claimed in claim 14, wherein the processor is further configured to implement operations of:
receiving a sliding-upward instruction generated in response to a dragging-upward operation on a top border of the reduced modal view;
converting the reduced modal view to the bottom modal view in response to a sliding distance resulted from the sliding-upward instruction being greater than or equal to a third threshold and less than a fourth threshold; and
converting the reduced modal view to the full-screen modal view in response to the sliding distance resulted from the sliding-upward instruction being greater than or equal to the fourth threshold.

16. The terminal as claimed in claim 12, wherein the bottom modal view comprises a full-screen modal button, the second instruction is indicated by the full-screen modal button being triggered.

17. The terminal as claimed in claim 11, wherein the first information has first n parameters having the most historical edit times, the bottom modal view comprises n third input widgets, and each of the third input widgets corresponds to a parameter of the first n parameters.

18. A non-transitory computer-readable storage medium, configured to store program instructions, wherein when the program instructions are executed by a processor, performing operations of:
instructing a screen to display a bottom modal view on a current user interface, in response to receiving a first instruction configured to indicate a state for receiving first information, the bottom modal view being a floating layer page displayed on the current user interface and comprising a first input widget, an area of the bottom modal view being less than an area of the current user interface;
inputting the first information based on an input signal in response to the first input widget being triggered;
converting the bottom modal view to a full-screen modal view in response to receiving a second instruction, an area of the full-screen modal view being same with the area of the current user interface, and the second instruction being an instruction triggered in response to a specified operation being performed on the bottom modal view;
instructing the screen to display m second input widgets in the full-screen modal view, the second input widgets being different from the first input widget, and m being a positive integer; and storing a second information in a terminal in response to receiving the second information on the second input widgets.

\* \* \* \* \*